(12) United States Patent
Merino Gonzalez et al.

(10) Patent No.: US 9,820,198 B2
(45) Date of Patent: Nov. 14, 2017

(54) WIRELESS CROSS RADIO TECHNOLOGY PLATFORMS DATA CALL RECOVERY

(71) Applicant: SHOO 533 LIMITED, Berkshire (GB)

(72) Inventors: Jose Luis Merino Gonzalez, Kortessem (BE); Graeme Hutchinson, Darlington (GB)

(73) Assignee: SHOO 533 LIMITED, Berkshire (GB)

( * ) Notice: Subject to any disclaimer, the term of this patent is extended or adjusted under 35 U.S.C. 154(b) by 0 days.

(21) Appl. No.: 14/772,889

(22) PCT Filed: Mar. 7, 2014

(86) PCT No.: PCT/GB2014/050671
§ 371 (c)(1),
(2) Date: Sep. 4, 2015

(87) PCT Pub. No.: WO2014/135887
PCT Pub. Date: Sep. 12, 2014

(65) Prior Publication Data
US 2016/0007248 A1    Jan. 7, 2016

(30) Foreign Application Priority Data
Mar. 7, 2013 (GB) .................................. 1304098.5

(51) Int. Cl.
*H04W 36/00* (2009.01)
*H04W 76/02* (2009.01)
(Continued)

(52) U.S. Cl.
CPC ....... *H04W 36/0066* (2013.01); *H04W 36/18* (2013.01); *H04W 76/028* (2013.01); *H04W 76/045* (2013.01)

(58) Field of Classification Search
None
See application file for complete search history.

(56) References Cited

U.S. PATENT DOCUMENTS

| | | | | |
|---|---|---|---|---|
| 2002/0167965 A1* | 11/2002 | Beasley | ............ | H04L 29/12009 370/465 |
| 2003/0084165 A1* | 5/2003 | Kjellberg | ................ | H04L 63/08 709/227 |

(Continued)

FOREIGN PATENT DOCUMENTS

| | | |
|---|---|---|
| EP | 2 296 424 A1 | 3/2011 |
| WO | 2012/065646 A1 | 5/2012 |

OTHER PUBLICATIONS

International Search Report, dated Aug. 29, 2014, issued in International Application No. PCT/GB2014/050671.
(Continued)

*Primary Examiner* — Kodzovi Acolatse
(74) *Attorney, Agent, or Firm* — Saul Ewing Arnstein & Lehr LLP

(57) ABSTRACT

A method, system- or apparatus-adapted to facilitate the recovery and continuation of a data communication active across different wireless technology platforms. The end-users wireless device is adapted and authorized to operate on such different wireless technology platforms managed through a server. Loss of data communication of an adapted wireless device on one wireless-platform is dealt with by allowing reconnection onto a different wireless-platform thereby allowing recovery of the original data communication and a continuation of the same previously originated data call, provided the time between loss of data or loss of coverage and the reconnection to the same or different wireless technology platform by the adapted wireless device is less than the timeout permitted by the adapted wireless device or by the adapted server through which all data communications or data calls are handled through.

5 Claims, 3 Drawing Sheets

(51) Int. Cl.
*H04W 36/18* (2009.01)
*H04W 76/04* (2009.01)

(56) References Cited

U.S. PATENT DOCUMENTS

| | | | |
|---|---|---|---|
| 2003/0137953 A1* | 7/2003 | Chae | H04W 36/18 370/331 |
| 2005/0043048 A1* | 2/2005 | Dolan | H04W 36/06 455/509 |
| 2006/0121902 A1* | 6/2006 | Jagadeesan | H04W 36/14 455/439 |
| 2006/0209798 A1 | 9/2006 | Oikarinen et al. | |
| 2010/0009674 A1* | 1/2010 | Sapkota | H04W 36/36 455/426.1 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP Standard; 3GPP TS 36.300, 3rd Generation Partnership Project (3GPP), Moblie Competence Centre; vol. RAN WG2, No. V10.9.0, pp. 1-94 (Jan. 7, 2013) XP050691677.

\* cited by examiner

WIRELESS CROSS RADIO TECHNOLOGY PLATFORMS DATA CALL RECOVERY

CROSS REFERENCE TO RELATED APPLICATIONS

This application claims the priority of PCT/GB2014/050671, filed on Mar. 7, 2014, which claims the benefit of priority to Great Britain Application No. 1304098.5, filed on Mar. 7, 2013, the entire contents of which are fully incorporated herein by reference.

BACKGROUND OF THE INVENTION

1. Field of the Invention

The present invention is directed to a wireless Internet service provider, mobile network operator or any such wireless operators for private or public use. Specifically, the invention is adapted to facilitate the recovering of a data communication or data call across different wireless technology platforms or across different private and public wireless networks, provided the user is an authorised user of such different wireless technology platforms or such different wireless-service providers or -network operators such that loss of data on one wireless-platform or -provider and a data reconnection on a same or different wireless-platform or -provider allows recovery of the original data call and thus a continuation of the same original data call.

2. Technical Background

Current wireless systems and methods do not provide for a way to recover and continue a wireless data communication or wireless data call across different radio technologies. The prior art solutions only apply when a wireless data communication or wireless data call remains within the same radio technology. The most commonly known definitions (mostly defined as standards) of these partial solutions in the prior art are known as different names, such as seamless hand-over, non-seamless hand-over, mid-call hand-over and so forth, however none of these standards and non-standard partial solutions in the prior art resolves the main issue for wireless end-user devices; which is to recover and continue a data call when changing throughout different radio technology platforms available and authorised for data use on such end-users wireless devices.

As a matter of illustration to understand the main issue this invention resolves and which has not been fixed by any of the prior arts; say a wireless device is capable of handling data communications or data calls through the following radio data technologies: WiFi (wireless fidelity) through a private- or public-WLAN (wireless local area network), GSM/UMTS (Global System for Mobile Communications/Universal Mobile Telecommunications Service) and that same user's wireless device is an authorised user of such previously mentioned wireless systems that provide radio coverage for such systems (i.e. WiFi and GSM/UMTS) then in the prior art if a wireless device user initiated a data call through WiFi and whilst it's on-going on that $1^{rd}$ radio technology platform WiFi to a $3^{rd}$ party and that data call is lost and the wireless device reconnects to a $2^{nd}$ radio technology platform GSM/UMTS, then such wireless device original data call is terminated permanently in the prior art.

The same would happen, namely a data call from a wireless device as described previously would be terminated after the initial data call on a $1^{st}$ radio technology platform looses data connection or radio coverage and such same data call would not recover and continue when the same wireless device reconnects to a 2nd different to the 1st radio technology platform in any combination; when from WiFi to GSM/UMTS or from GSM/UMTS to WiFi or between any such other wireless technology platforms or also referred herein as radio technology platforms.

Recently, fixed line and mobile network operators and service providers in particular have begun to offer on-line (internet) services allowing individuals to make wireless text-, voice- and video-data calls over a variety of standards or proprietary protocols competing head-on with the traditional analogue and digital data calls from traditional network operators, yet none provide a solution that would allow a wireless device end-user to restore an original data call on one radio technology to continue that same data call when the wireless device reconnects on another radio technology, provided the time between loosing data connection from the $1^{st}$ radio technology and re-connecting to the same or to a $2^{nd}$ radio technology is within a reasonable timeframe acceptable to end-users (i.e. in the region of seconds or tenths of seconds not minutes).

Attempts have been made to ease the way to wireless end-users always focused on some form of hand-over defined in standards and some non standard; however none of the prior art allows any reliable solution across different radio technologies available in end-users wireless devices to which they are authorised users to, other then the partial solution described above, which in itself does not provide a solution to the issue described herein before.

SUMMARY OF THE INVENTION

The present invention is designed to overcome the shortcomings of the prior art and to provide an automated way of keeping a wireless data communication or data call between two or more parties going whilst one or more parties move between wireless networks of different radio network technologies and those networks not necessarily related to each other, meaning operated by different providers or network operators or privately operated.

The present invention -method, -system or -apparatus is to be offered by private or public wireless networks or by mobile network operators or service providers or even by traditional telephony companies (fixed or mobile network operator), virtual network operators, or any such company or network that wishes to allow their users to keep their data communications functioning across radio technology platforms. This is achieved by doing the reverse then is commonly used in the prior art namely; namely the prior art relies on inter technology platforms interoperability standards yet when a user with a wireless device moves out of the coverage area from the network operator (i.e. UMTS) through which it had initially established a data communication or data call with a $3^{rd}$ party, then despite the fact that when the user moves into no coverage area (no or too bad UMTS coverage) whilst a different wireless network such as a free wireless WiFi does provide coverage to which the wireless connects to, then that specific data communication or data call is ended permanently between the parties despite the fact that the $3^{rd}$ party is still in data communication or data call with and will be terminated too.

The invention herein as said before, the opposite, does not rely on any standards and resolves the data call loss of coverage loss by reconnecting to the same $3^{rd}$ party through a server and wireless devices adapted to incorporate the benefits of inventions.

This invention relies on the wireless device users that move in and out different wireless technology platforms coverage areas to incorporate in the wireless device a "Proprietary Internet Protocol Call-recovery Module" ("PipCrM") and to be authorised users of a "Proprietary Voip Call-recovery system" ("PVoipCrS") or also referred to as a "Proprietary IP Call-recovery system" ("PipCrS") or also referred to as a "Proprietary Cross platforms Call-recovery system" ("PcfCrS") with a built-in "Proprietary Voice over Internet Protocol Call-recovery Module" ("PVoipCrM"), which incorporate the benefits of this invention. At the time a "PipCrM" initiates a wireless data call to one or more $3^{rd}$ parties, then at the time the "PipCrM" of the data call initiating party establishes a wireless data communication with a "PVoipCrM" of a corresponding "PVoipCrS" or "PipCrS" or "PcfCrS", then that specific data call will assigned a "Unique Call Identifier" ("UCI"). The "PVoipCrM" of the corresponding "PVoipCrS" or "PipCrS" or "PcfCrS" will pass on that same "UCI" to any $3^{rd}$ party receiving such specific data communication if such $3^{rd}$ party also has a built-in PipCrM.

When any wireless device in an on-going data communication, with a build-in PipCrM and an assigned UCI, looses data connection for less then a pre-programmed time then the PipCrM will automatically reconnect to the "PVoipCrM" of the corresponding PVoipCrS or PipCrS or PcfCrS and re-establish data communication with the $3^{rd}$ party or parties with the same UCI.

Such previous mentioned loss of data connection can be due to a variety of reasons, such as loss of wireless radio coverage or loss of data synchronisation due to high bit error rate or any such other reason that may result in a loss data communication between a PipCrM and a "PVoipCrM" of the corresponding PVoipCrS or PipCrS or PcfCrS.

Also such previous mentioned a pre-programmed time in a PipCrM, and in the PVoipCrM of the corresponding PVoipCrS or PipCrS or PcfCrS to which that PipCrM is connected to, can be stored as a fixed time or as a variable time remotely programmed into a PipCrM for example by a corresponding PVoipCrM of the corresponding PVoipCrS or PipCrS or PcfCrS to which the wireless device user with such built-in PipCrM in an authorised user to. If the time of a data connection or data communication loss of a wireless device with a built-in PipCrM and the PVoipCrM of the corresponding PVoipCrS or PipCrS or PcfCrS to which that PipCrM is connected to is more then the pre-programmed time then on one hand the PipCrM will end that specific data call or data communication and permanently delete the corresponding UCI and on the other hand the PVoipCrM of the corresponding PVoipCrS or PipCrS or PcfCrS to which that PipCrM that originated the data call was connected to will inform each other party PipCrM that has the same UCI to also end that specific data call or data communication and permanently delete the corresponding UCI.

An object of the present invention is to reduce the data calls that are aborted, but more importantly specifically those calls that are aborted due to the probability of wireless end-users moving between cellular/mobile networks and for example WiFi/WiMax, to synchronize on data loss as fast as possible to any of the available wireless data network, performed in a fully automated manner, provided such wireless end-user makes use of the benefits of this invention and is an authorised user of such wireless data networks to which the wireless connects to.

Another object of the present invention is to help private individual or business users to keep a data communications active when crossing between outdoors and indoors wireless networks coverage, such as for example between say an outdoor Mobile Network with typical good outdoor data coverage whilst typically poor or no indoor data coverage however with good private or business indoor WiFi data coverage.

Another object of the invention is to provide for a reliable way to allow for cross platform or cross technologies wireless data communication interoperability by incorporating the benefits of this invention into any such existing wireless networks.

Additional features and advantages of the invention will be set forth in the description which follows, and in part will be apparent from the description, or may be learned by practicing the invention. The objectives and other advantages of the invention will be realized and attained by the structure particularly pointed out in the written description and claims as well as the drawings hereto.

BRIEF DESCRIPTION OF THE FIGURES

Aspects of the invention will now be described, by way of example(s), with reference to the following Figures, in which.

DETAILED DESCRIPTION

Figure 1:
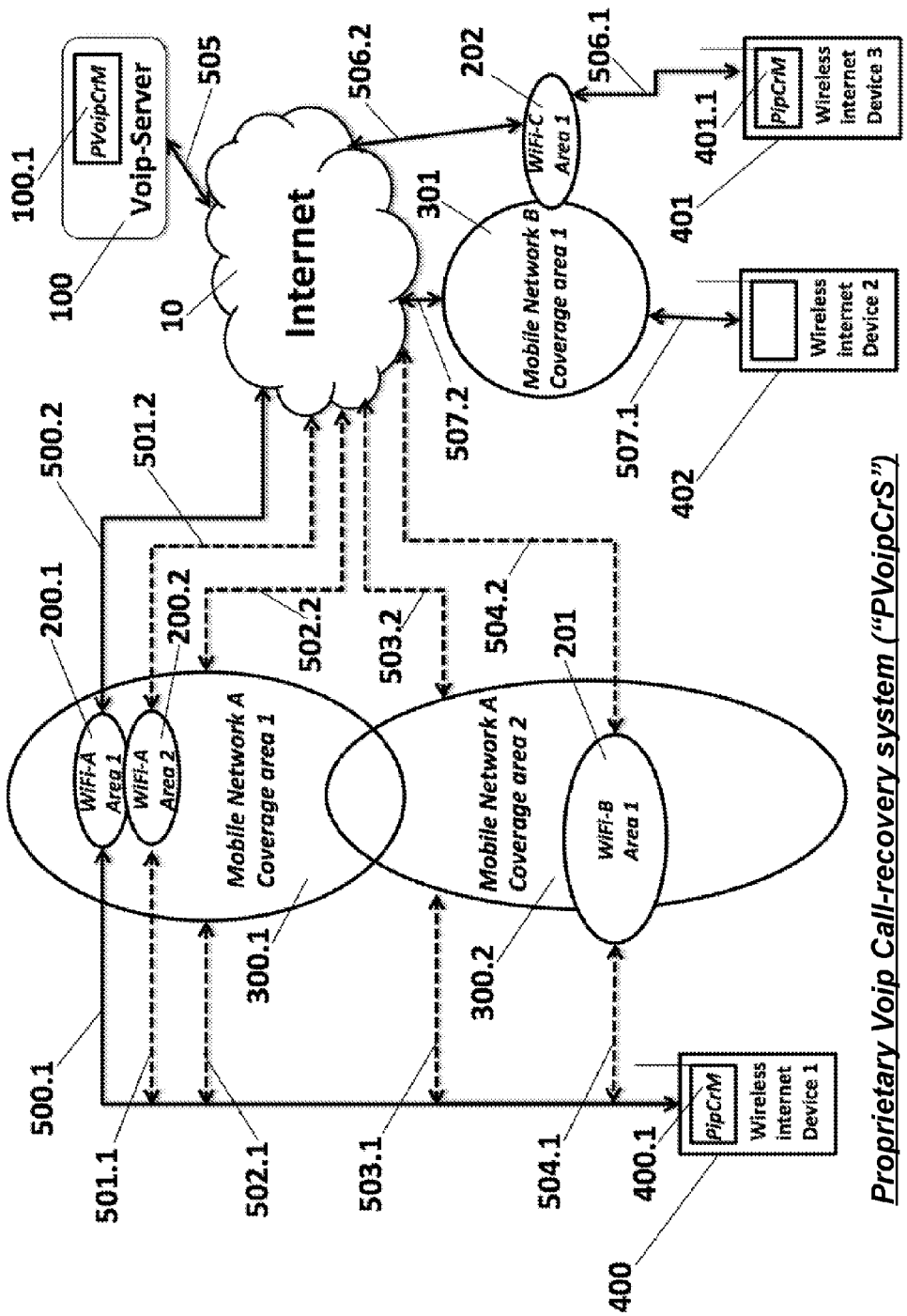
FIG. 1 shows a system diagram of a preferred embodiment of the present invention.
Figure 2:
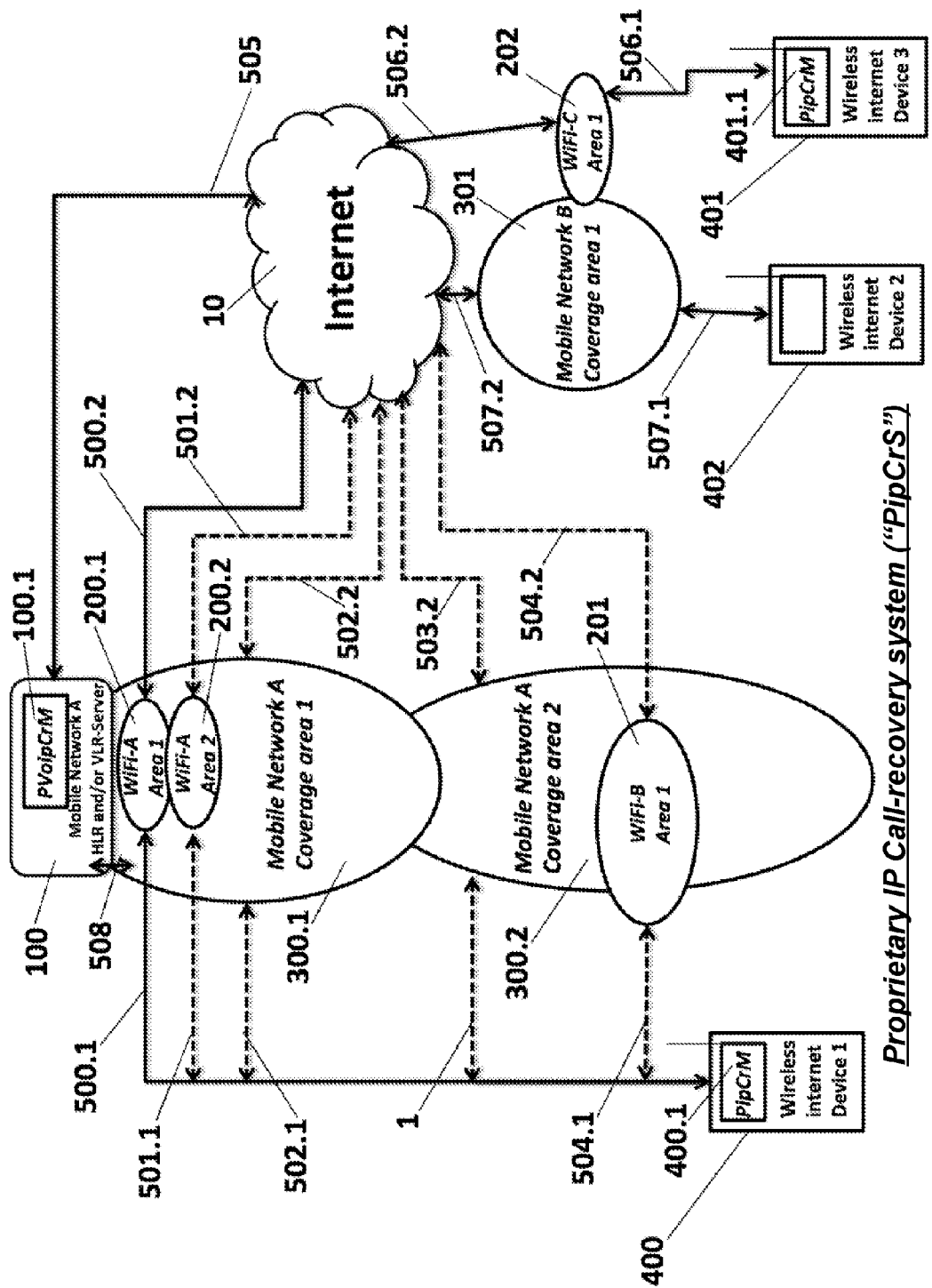
FIG. 2 shows a system diagram of a different preferred embodiment of the present invention.

With reference to FIGS. 1 and 2 by way of example, a system, which could be a private or commercial server 100, in any location in the world, which uses Internet, and which includes one or more databases and an external Internet access to the public Internet 10. Additional external access means to the system can also be present.

Specifically in FIG. 1 it is shown one of the preferred embodiments of the present invention, referred to as a "Proprietary Voip Call-recovery system" ("PVoipCrS"). The end-users mobile devices are shown as wireless Internet devices 400, 401 and 402 and identifying such specific end-user devices that have downloaded, incorporated or embedded in it a "PipCrM" ("Proprietary Internet Protocol Call-recovery Module") referred to as 400.1 and 401.1 in FIG. 1. Furthermore there is identified a "Voip-server" 100, with downloaded, incorporated or embedded in it a "PVoipCrM" ("Proprietary Voice over Internet Protocol Call-recovery Module") referred to as 100.1 in FIG. 1.

Also shown are two different Mobile Network operators A and B, and an example of their respective coverage areas; 300.1, 300.2 and 301. Additionally it is shown three different WiFi networks A and B, and an example of their respective coverage areas; 200.1, 200.2, 201 and 202.

It's only those end-users with wireless devices with a build-in "PipCrM" ("Proprietary Internet Protocol Call-recovery Module") 400 and 401.1 and being registered authorised users of the service provided through the public Internet 10 by a Voip-Server 100 with a build-in "PVoipCrM" ("Proprietary Voice over Internet Protocol Call-recovery Module") 100.1 that will benefit from the full advantages of the present invention.

The data connections are shown as 500.1, 501.1, 502.1, 503.1, 504.1, 500.2, 501.2, 502.2, 503.2, 504.2, 505, 506.1, 506.2, 507.1 and 507.2 within FIG. 1.

In order to understand the full benefits of the present invention an example will be explained in detail, starting with;

step 1: an end-user (400) with build-in 400.1 making a Voip-call or establishes a data communication with a different end-user (401), which device is identified in FIG. 1 as "Wireless Internet Device 3". Both end-users are authorised users of the Voip-Server (100). The data connection route is as follows; from call originating end-user (400) and "PipCrM" (400.1) through wireless data communication 500.1, through WiFi-A (200.1), through data communication 501.2 to the public Internet (100) and then through data communication 505 to Voip-Server (100) with build-in "PVoipCrM" (100.1) who assigns a "unique call identifier" ("UCI") to this specific call and makes it accessible to each "PipCrM" in that call and then back through data communication 505 through the public Internet and then through the data communication 506.2 through WiFi-C (202), through wireless communication 506.1 with call terminating different end-user (401) which device is identified in FIG. 1 as "Wireless Internet Device 3". As this is two-way data communication between device 400 and device 401, the return path is exactly the reverse path explained before.

step 2: once end-user (400) and the different end-user (401) are in communication, then end-user decides to move whilst in communication through the coverage 1 of WiFi-A (200.1) and as it leaves that coverage are (200.1) it looses the data communication. The end-user device (400) will then reconnect to one of the available networks that cover his current location, for example same WiFi-A using a repeater covering area 2 or Mobile Network A Coverage area 1. Let's assume end-user device 400 re-connects now to WiFi-A Area (200.2) and then the build-in "PipCrM" (400.1) provided the time between having lost data connection and having re-established data connection is less then that programmed in the "PipCrM" (400.1) then it will automatically re-establish data communication between device 1 (400) and the Voip-Server (100) internal "PVoipCrM" 100.1, through data communications 501.1, 501.2 and 505. The "PipCrM" (400.1) will provide the previous temporarily stored "unique call identifier" of that call such that the "PVoipCrM" will reconnect the data communication coming from device 1 (400) with the still on-going call or data communication corresponding with that "unique call identifier" which remains identical as in previous Step 1 as end-user of device 3 (401) remained static.

Thus the data communication path of the two-way data communication call corresponding to the "UCI" of Step 1 between device 3 (401) and Voip-Server (100) remains the same, namely; data communication 505, through Internet (10), 506.2, through WiFi-C (202), 506.1 and same reverse path.

step 3: following-on end-user (400) and the different end-user (401) are still in the same communication call (same "UCI"), then end-user decides to move further down whilst in communication through the coverage 2 of WiFi-B (200.2) and as it leaves that coverage are (200.2) it looses the data communication. The end-user device (400) will then reconnect to one of the available networks that cover his current location, for example to Mobile Network A Coverage area 1. Thus end-user device 400 re-connects now to Mobile Network A Coverage area 1 (300.1) and then the build-in "PipCrM" (400.1) provided the time between having lost data connection and having re-established data connection is less then that programmed in the "PipCrM" (400.1) then it will automatically re-establish data communication between device 1 (400) and the Voip-Server (100) internal "PVoipCrM" (100.1), through data communications 502.1, 502.2 and 505. The "PipCrM" (400.1) will provide the previous temporarily stored "unique call identifier" ("UCI") of that call such that the "PVoipCrM" will reconnect the data communication coming from device 1 (400) with the still on-going call or data communication corresponding with that "unique call identifier" ("UCI") which remains identical as in previous Step 1 as end-user of device 3 (401) remained static.

Thus the data communication path of the two-way data communication call corresponding to the "UCI" of Step 1 between device 3 (401) and Voip-Server (100) remains the same, namely; data communication 505, through Internet (10), 506.2, through WiFi-C (202), 506.1 and same reverse path.

step 4: following-on end-user (400) and the different end-user (401) are still in the same communication call (same "UCI"), then end-user decides to move even more further down whilst in communication through the coverage 1 of Mobile Network A (300.1) and as it leaves that coverage are (300.1) it looses the data communication. The end-user device (400) will then reconnect to one of the available networks that cover his current location, for example to Mobile Network A Coverage area 2. Thus end-user device 400 re-connects now to Mobile Network A Coverage area 2 (300.2) and then the build-in "PipCrM" (400.1) provided the time between having lost data connection and having re-established data connection is less then that programmed in the "PipCrM" (400.1) then it will automatically re-establish data communication between device 1 (400) and the Voip-Server (100) internal "PVoipCrM" (100.1), through data communications 503.1, 503.2 and 505. The "PipCrM" (400.1) will provide the previous temporarily stored "unique call identifier" ("UCI") of that call such that the "PVoipCrM" will reconnect the data communication coming from device 1 (400) with the still on-going call or data communication corresponding with that "unique call identifier" ("UCI") which remains identical as in previous Step 1 as end-user of device 3 (401) remained static.

Thus the data communication path of the two-way data communication call corresponding to the "UCI" of Step 1 between device 3 (401) and Voip-Server (100) remains the same, namely; data communication 505, through Internet (10), 506.2, through WiFi-C (202), 506.1 and same reverse path.

step 5: following-on end-user (400) "Wireless Internet Device 1" and the different end-user (401) "Wireless Internet Device 3" are still in the same communication call (same "UCI"), then end-user (400) decides to move even more further down whilst in communication through the coverage 2 of Mobile Network A (300.1) and as it remains in that same coverage are the wireless device looses data connection despite having coverage (300.1), so it looses the data communication. The end-user device (400) will then reconnect to one of the available networks that cover his current location, for example to Mobile Network A Coverage area 2 (300.2) or to WiFi-B Area 1" (201). Let's assume in this example that end-user device (400) re-connects now to "WiFi-B area 1" (201) and then the build-in "PipCrM" (400.1) provided the time between having lost data connection and having re-established data connection is less then that programmed in the "PipCrM" (400.1) then it will automatically re-establish data communication between "Wireless Internet Device 1" (400) and the Voip-Server (100) internal "PVoipCrM" (100.1), through data communications 504.1, 504.2 and 505. The "PipCrM" (400.1) will provide the previous temporarily stored "unique call identifier" ("UCI") of that call such that the "PVoipCrM" (100.1) will reconnect the data communication coming from "Wireless Internet Device 1" (400) with the still on-going call or data communication corresponding with that "unique call identifier" ("UCI") which remains identical as in previous Step 1 to 4 as end-user of "Wireless Internet Device 3" (401) remained static.

Thus the data communication path of the two-way data communication call corresponding to the "UCI" of Step 1 through to this step 5 between "Wireless Internet Device 3" (401) and Voip-Server (100) remains the same, namely; data communication 505, through Internet (10), 506.2, through WiFi-C (202), 506.1 and same reverse path.

Finally the call will be terminated as soon as any of the parties in call or in data communication with the same "UCI" ends the call, in our example the call is terminated when "Wireless Internet Device 1" user (400) or "Wireless Internet Device 3" user (401) terminates the call, then the process initiated is the same as if the time threshold of data communication loss or coverage loss was exceeded by one of the devices (400.1 of device 400 or 401.1 of device 401).

Namely at call termination by the end-user then "PipCrM" (400.1) of the device (400) or the "PipCrM" (401.1) of the device (401) will terminate the call and clear or delete the "unique call identifier" ("UCI") such that the "PipCrM" (400.1 or 401.1) will automatically inform "PVoipCrM" (100.1) build into the Voip-Server (100) to terminate the call with that "UCI", meaning terminate the call of both "Wireless Internet Device 1 and 3" (400 and 401) and also clear that "UCI" in the "PVoipCrM" (100.1) and in all the corresponding "PipCrM" (400.1 and 401.1).

If at any time during any of the steps 1 to 5 described herein the time between having lost data connection, or loss of coverage of any "Wireless Internet Device" with a build-in "PipCrM" (400.1 or 401.1) and having re-established data connection is less then that programmed then the "PipCrM" (400.1) of the device (400) or the "PipCrM" (401.1) of the device (401) will terminate the call and clear or delete the "unique call identifier" ("UCI") such that the "PipCrM" (400.1 or 401.1) will automatically inform "PVoipCrM" (100.1) build into the Voip-Server (100) to terminate the call with that "UCI", meaning terminate the call of both "Wireless Internet Device 1 and 3" (400 and 401) and also clear that "UCI" in the "PVoipCrM" (100.1) and in all the corresponding "PipCrM" (400.1 and 401.1).

Specifically in FIG. 2 by way of example, it is shown a different preferred embodiments of the present invention, referred to as a "Proprietary IP Call-recovery system" ("PipCrS"). The key aspect of this preferred embodiment variant is that the "Proprietary Voip Call-recovery Module" ("PVoipCrM") is co-located or embedded within a Home Location Register (HLR), Visitor Location Register (VLR) or in both HLR and VLR. Such HLR and VLR function being performed by a traditional hardware device yet adapted and connected to the internet or such function(s) performed by software embedded in a server connected to the internet, referred to in FIG. 2 as "HLR and/or VLR-Server" (100) and such "PVoipCrM" (100.1) embedded within such "HLR and/or VLR Server" (100), where this last (100) is embedded into or connects on one hand to a Mobile Network Operator A (300.1) through data connection 508 and on the other hand connects to the public Internet (19) through data connection 505.

The steps 1 to 5 explained above as part of the FIG. 1 detailed description fully apply as is also as the detailed description of FIG. 2, safe for the previous mentioned location of the "PVoipCrM" (100.1) embedded into server called "HLR and/or VLR-Server" (100).

Figure 3:
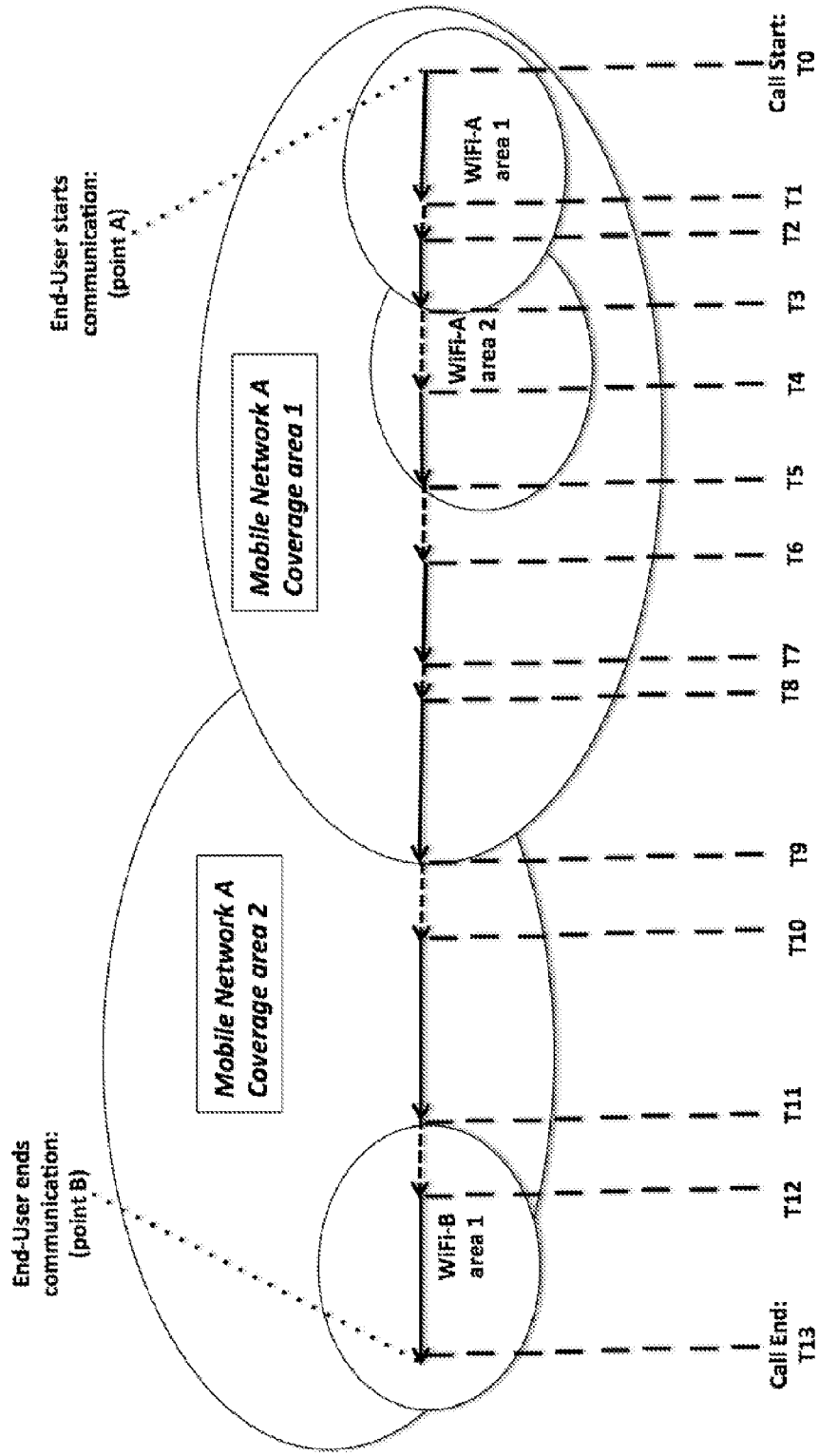
FIG. 3 shows a time-distance diagram of an end-user's communication non static behaviour example within the scope of the previous preferred embodiments of the present invention.

Specifically in FIG. 3 it is shown a time versus location diagram as explained in the two different preferred embodiments, of FIGS. 1 and 2, of the present invention, referred to as a "Proprietary Cross Platforms Call-recovery system" ("PcfCrS").

The FIG. 3, safe for the micro cut in data connection or micro coverage loss between T1 and T2 and between T7 and T8, is identical to the Steps 1 to 5 explained previously in the detailed description of FIG. 1.

The present invention as shown in FIG. 3 shows that provided the time between having lost data connection and having re-established data connection is less then that programmed in the "PipCrM" ("Propriety Internet Protocol Call-recovery Module"), as shown in FIGS. 1 and 2, then the data communication or data call with the same "UCI" ("Unique Caller Identifier") will be automatically re-established at the time the "PipCrM" reconnects to any available authorised data connection.

Such authorised data connection can be a data connection of in example the following, but not limited to:
  a free WiFi
  a protected WiFi with the protection key embedded in the wireless device
  a WiFi Network data connection to which the user is subscribed to
  a Mobile Network data connection to which the user is subscribed to (GSM-GPRS-UMTS-HSDPA, 2G, 3G, 4G, CDMA, WCDMA or any such present or future mobile data networks.

Further to FIG. 3, at T0 the End user starts a data communication, at "point A" on his wireless device with a build in "PipCrM" ("Propriety Internet Protocol Call-recovery Module", connected to "WiFi-A area 1" with a 3$^{rd}$ party end-user and the "Proprietary Cross Platforms Call-recovery system" ("PcfCrS") assigns a "Unique call identifier" ("UCI") through it's "PVoiPCrM" ("Propriety Voice Over Internet Protocol Call-recovery Module" to that specific call initiated at T0.

On T1 wireless device looses coverage with "WiFi-A area 1"

On T2 wireless device re-connects with "WiFi-A area 1"

On T3 wireless device looses coverage with "WiFi-A area 1"

On T4 wireless device auto-connects with "WiFi-A area 2"

On T5 wireless device looses coverage with "WiFi-A area 2"

On T6 wireless device auto-connects with "Mobile Network A, Coverage area 1"

On T7 wireless device looses coverage with "Mobile Network A, Coverage area 1"

On T8 wireless device re-connects with "Mobile Network A, Coverage area 1"

On T9 wireless device looses coverage with "Mobile Network A, Coverage area 1"

On T10 wireless device auto-connects with "Mobile Network A, Coverage area 2"

On T11 wireless device looses coverage with "Mobile Network A, Coverage area 1"

On T12 wireless device auto-connects with "WiFi-B area 1"

At T13 the end-user ends the data call with the 3$^{rd}$ party once arrived at "point B" and then the "Proprietary Cross Platforms Call-recovery system" ("PcfCrS") deletes and removes the temporary "Unique call identifier" ("UCI") of that specific data call started at T0 through also deleting that specific UCI in the "PVoipCrM" ("Proprietary Voice Over Internet Protocol Call-recovery Module" and the "PipCrM" ("Proprietary Internet Protocol Call-recovery Module of all the wireless devices that were in that data call started at T0 and ended at T3.

Each re-connect or auto-connect, at times T2, T4, T6, T8, T10 and T12 were made automatically by the end-user wireless device build-in "PipCrM" ("Proprietary Internet Protocol Call-recovery Module automatically re-connecting to the same 3$^{rd}$ party end-user on which it started the data call at T0. Such same data call identified by it's Unique Call Identifier (UCI)".

Also each real-time elapsed between T1 and T2, T3 and T4, T5 and T6, T7 and T8T9 and T19, Y11 and T12 which is in essence the time between having lost data connection and having re-established data connection is less then that programmed is the "PipCrM" ("Proprietary Internet Protocol Call-recovery Module".

In the event that any of the real-time elapsed between any of the following T1 and T2, T3 and T4, T5 and T6, T7 and T8T9 and T19, Y11 and T12 which is in essence the time, between having lost data connection and having re-established data connection is more the that programmed is the "PipCrM" ("Proprietary Internet Protocol Call-recovery Module" then at any such data loss time expiration the data call with that specific "UCI" will be terminated and such UCI deleted.

Any of the various components or sub-steps disclosed above can be used either alone, or in multiple parallel set-ups, or with other components, or with individual or combined components or features of the present invention.

It will be apparent to those skilled in the art that various modifications and variations can be made to the "Proprietary Voip Call-recovery System (PVoipCrS)" system of the present invention without departing from the spirit or scope of the invention.

The foregoing disclosure of embodiments of the present invention has been presented for purposes of illustration and description. It is not exhaustive or intended to limit the invention to the precise forms disclosed herein. Many variations and modifications of the embodiments described herein will be obvious to one of ordinary skill in the art in light of the above disclosure. The scope of the invention is to be defined only by the claims appended hereto, and by their equivalents.

The invention claimed is:

1. A system including an "adapted data communications network" (ADCN), the ADCN operable over a plurality of different "radio technology platforms" (RTP or RTPs) be those private or public and be they operated by the same or different network operators or network providers, wherein such system that enables end-users who are calling party or parties, using an "adapted wireless device" (AWD or AWDs) authorised to operate on the ADCN through a plurality of different "radio technologies" (RT or RTs), or also referred to as radio platforms (RP or RPs), or also referred to as RTP or RTPs, supported by such AWDs, to initiate a data communication or data call, with a called 3$^{rd}$ party or with called 3rd parties, through one RTP, and on loss of a data connection, to recover that same data communication or data call between the calling party and called party or called parties at a data connection over any of all the different RTPs supported by the AWD and recover and continue such same data communication or data call between the previous mentioned calling party and the same called party or called parties within available radio coverage areas from the plurality of different RTPs, provided a time between losing the data connection by the AWD and re-connecting to any authorised RTP is less than a "call recovery time-out" (CRTO) value stored in the AWD and the ADCN, such system comprising all of the following:

(a)—a "proprietary internet server call recovery module" (PISCRM) and at least one or more ADCN, such ADCN being any such existing data communications system adapted by embedding in it or interfacing to it the PISCRM, wherein the PISCRM is configured to maintain data communication through the internet between each party's (calling and called) AWD with a same "Unique Data Call Identifier" (UDCID), meaning belonging to the same data call;

(b)—at least one or more AWD, such AWD being any such existing wireless device capable of communicating through the internet and capable of communicating with two or more different radio technologies, such wireless device adapted by embedding in it or downloading into it a "proprietary wireless device call recovery module" (PWDCRM) wherein any such PWDCRM in communication with a PISCRM when transitioning from radio coverage loss or data connection loss to any such AWD supported radio data re-connection is configured to automatically reconnect the PISCRM with the UDCID and the PISCRM is configured to reconnect the wireless device to any such party with the same UDCID, wherein such UDCID is cleared or deleted at any call-end provoked by any end-user on such call with the same UDCID or by expiration of the CRTO of any party with the same UDCID by any such corresponding PWDCRM or PISCRM, or any such new call initiated by an end-user on a AWD with a built-in PWDCRM, and if the UDCID, available to any such AWD with a built-in PWDCRM in data communication with a 3$^{rd}$ party through a PISCRM of a ADCN, is undefined or has no value or an undefined value or is empty or has been deleted due to a previous CRTO expiration then at any next transitioning from radio coverage loss or data connection loss to any such AWD, a supported radio data re-connection will not attempt to recover any such previous call, if any, and (c)—at least one or more CRTO stored value that is used by all PISCRM of each ADCN and by all PWDCRM of each AWD of a corresponding data call that has the same UDCID, wherein each PWDCRM where the CRTO expires is configured to autonomously and asynchronously end or terminate such data call independently to the corresponding PISCRM, whilst independently when at the PISCRM side the CRTO expires for a specific UDCID data call the PISCRM is configured to inform all still connected PWDCRMs with the same UDCID to also end or terminate such specific data call with that specific UDCID, wherein the CRTO is stored as a fixed default value, or is remotely overwriteable, as a new value different to the default value, within the PWDCRM of the calling party's AWD upon initial data call set-up between such PWDCRM and a PISCRM of the ADCN, and such CRTO value is then provided by the PWDCRM to the PISCRM which in turn provides such CRTO value to all called parties of that data call with the same UDCID that have a built-in PWDCRM.

2. A system according to claim 1 wherein the PWDCRM of the calling party's AWD is configured to generate the UDCID upon initial data call set-up between the PWDCRM of the calling party's AWD when connecting to the PISCRM of the ADCN, and the PISCRM of the ADCN is configured to provide the UDCID to all called parties of that same data call that have a built-in PWDCRM.

3. A system according to claim 1 wherein the PISCRM of the ADCN is configured to generate the UDCID upon initial data call set-up between the PWDCRM of the calling party's AWD when connecting to the PISCRM of the ADCN, and the PISCRM of the ADCN is configured to provide the UDCID to all called parties of that same data call that have a built-in PWDCRM.

4. A system including an "adapted data communications network" (ADCN), the ADCN operable over a plurality of different "radio technology platforms" (RTP or RTPs) be those private or public and be they operated by the same or different network operators or network providers, wherein such system enables end-users, who are calling party or parties, using an "adapted wireless device" (AWD or AWDs) authorised to operate on the ADCN through a plurality of different "radio technologies" (RT or RTs), or also referred to as radio platforms (RP or RPs), or also referred to as RTP or RTPs, supported by such AWDs, to initiate a data communication or data call, with a called 3rd party or with called 3rd parties, through one RTP, and on loss of a data connection, to recover that same data communication or data call between the calling party and called party or called parties at a data connection over any of all the different RTPs supported by the AWD and recover and continue such same data communication or data call between the previous mentioned calling party and the same called party or called parties within available radio coverage areas from the plurality of different RTPs, provided a time between losing the data connection by the AWD and re-connecting to any authorised RTP is less than a "call recovery time-out" (CRTO) value stored in the AWD and the ADCN, such system comprising all of the following:
  (a)—a "proprietary internet server call recovery module" (PISCRM) and at least one or more ADCN, such ADCN being any such existing data communications system adapted by embedding in it or interfacing to it the PISCRM, wherein the PISCRM is configured to maintain data communication through the internet between each party's (calling and called) AWD with a same "Unique Data Call Identifier" (UDCID), meaning belonging to the same data call;
  (b)—at least one or more AWD, such AWD being any such existing wireless device capable of communicating through the internet and capable of communicating with two or more different radio technologies, such wireless device adapted by embedding in it or downloading into it a "proprietary wireless device call recovery module" (PWDCRM), wherein any such PWDCRM in communication with a PISCRM when transitioning from radio coverage loss or data connection loss to any such AWD supported radio data re-connection is configured to automatically reconnect the PISCRM with the UDCID and the PISCRM is config-
  ured to reconnect the wireless device to any such party with the same UDCID, wherein such UDCID is cleared or deleted at any call-end provoked by any end-user on such call with the same UDCID or by expiration of the CRTO of any party with the same UDCID by any such corresponding PWDCRM or PISCRM, or any such new call initiated by an end-user on a AWD with a built-in PWDCRM, and
  if the UDCID, available to any such AWD with a built-in PWDCRM in data communication with a 3rd party through a PISCRM of a ADCN, is undefined or has no value or an undefined value or is empty or has been deleted due to a previous CRTO expiration then at any next transitioning from radio coverage loss or data connection loss to any such AWD, a supported radio data re-connection will not attempt to recover any such previous call, if any, and
  (c)—at least one or more CRTO stored value that is used by all PISCRM of each ADCN and by all PWDCRM of each AWD of a corresponding data call that has the same UDCID, wherein each PWDCRM where the CRTO expires is configured to autonomously and asynchronously end or terminate such data call independently to the corresponding PISCRM, whilst independently when at the PISCRM side the CRTO expires for a specific UDCID data call the PISCRM is configured to inform all still connected PWDCRMs with the same UDCID to also end or terminate such specific data call with that specific UDCID,
wherein the PWDCRM of the calling party's AWD is configured to generate the UDCID upon initial data call set-up between the PWDCRM of the calling party's AWD when connecting to the PISCRM of the ADCN, and the PISCRM of the ADCN is configured to provide the UDCID to all called parties of that same data call that have a built-in PWDCRM, and
wherein the UDCID includes a field for time, which is available real time when generated, a field for date, which is date when generated, and a field for a random generated sequence and a field for the IMSI of the calling party if available otherwise this field is kept empty, and when the UDCID is generated by the PWDCRM then the IMSI, if available through the PWDCRM reading this value from the SIM of the AWD, is written into the corresponding UDCID field for the IMSI value, if such SIM IMSI value is accessible and readable by the PWDCRM, and if the UDCID is generated by the PISCRM then the corresponding UDCID field for the IMSI value will be that provided by the PWDCRM calling party or if not provided then that field value will be set to empty.

5. A system including an "adapted data communications network" (ADCN), the ADCN operable over a plurality of different "radio technology platforms" (RTP or RTPs) be those private or public and be they operated by the same or different network operators or network providers, wherein such system enables end-users, who are calling party or parties, using an "adapted wireless device" (AWD or AWDs) authorised to operate on the ADCN through a plurality of different "radio technologies" (RT or RTs), or also referred to as radio platforms (RP or RPs), or also referred to as RTP or RTPs, supported by such AWDs, to initiate a data communication or data call, with a called 3rd party or with called 3rd parties, through one RTP, and on loss of a data connection, to recover that same data communication or data call between the calling party and called party or called parties at a data connection over any of all the different RTPs supported by the AWD and recover and continue such same data communication or data call between the previous mentioned calling party and the same called party or called parties within available radio coverage areas from the plurality of different RTPs, provided a time between losing the data connection by the AWD and re-connecting to any authorised RTP is less than a "call recovery time-out" (CRTO) value stored in the AWD and the ADCN, such system comprising all of the following:

(a)—a "proprietary internet server call recovery module" (PISCRM) and at least one or more ADCN, such ADCN being any such existing data communications system adapted by embedding in it or interfacing to it the PISCRM, wherein the PISCRM is configured to maintain data communication through the internet between each party's (calling and called) AWD with a same "Unique Data Call Identifier" (UDCID), meaning belonging to the same data call;

(b)—at least one or more AWD, such AWD being any such existing wireless device capable of communicating through the internet and capable of communicating with two or more different radio technologies, such wireless device adapted by embedding in it or downloading into it a "proprietary wireless device call recovery module" (PWDCRM), wherein any such PWDCRM in communication with a PISCRM when transitioning from radio coverage loss or data connection loss to any such AWD supported radio data re-connection is configured to automatically reconnect the PISCRM with the UDCID and the PISCRM is configured to reconnect the wireless device to any such party with the same UDCID, wherein such UDCID is cleared or deleted at any call-end provoked by any end-user on such call with the same UDCID or by expiration of the CRTO of any party with the same UDCID by any such corresponding PWDCRM or PISCRM, or any such new call initiated by an end-user on a AWD with a built-in PWDCRM, and if the UDCID, available to any such AWD with a built-in PWDCRM in data communication with a 3rd party through a PISCRM of a ADCN, is undefined or has no value or an undefined value or is empty or has been deleted due to a previous CRTO expiration then at any next transitioning from radio coverage loss or data connection loss to any such AWD, a supported radio data re-connection will not attempt to recover any such previous call, if any, and (c)—at least one or more CRTO stored value that is used by all PISCRM of each ADCN and by all PWDCRM of each AWD of a corresponding data call that has the same UDCID, wherein each PWDCRM where the CRTO expires is configured to autonomously and asynchronously end or terminate such data call independently to the corresponding PISCRM, whilst independently when at the PISCRM side the CRTO expires for a specific UDCID data call the PISCRM is configured to inform all still connected PWDCRMs with the same UDCID to also end or terminate such specific data call with that specific UDCID, wherein the CRTO is stored as a fixed default value or is remotely overwriteable, as a new value different to the default value, within the PISCRM of the ADCN upon initial data call set-up between a PWDCRM and such PISCRM of the ADCN, and the PISCRM is configured to provide the CRTO to the calling party's PWDCRM, and to all called parties of that data call with the same UDCID that have a built-in PWDCRM.

* * * * *